United States Patent
Wain et al.

(10) Patent No.: US 10,247,045 B2
(45) Date of Patent: Apr. 2, 2019

(54) HEAT UTILIZATION IN ORC SYSTEMS

(71) Applicant: ElectraTherm, Inc., Reno, NV (US)

(72) Inventors: Hans Wain, Truckee, CA (US); David C Williams, Carson City, NV (US); Paul Hughes, Reno, NV (US)

(73) Assignee: Bitxer US, Inc., Flowery Branch, GA (US)

( * ) Notice: Subject to any disclaimer, the term of this patent is extended or adjusted under 35 U.S.C. 154(b) by 397 days.

(21) Appl. No.: 14/944,213

(22) Filed: Nov. 18, 2015

(65) Prior Publication Data

US 2016/0069220 A1    Mar. 10, 2016

Related U.S. Application Data

(63) Continuation-in-part of application No. 14/625,616, filed on Feb. 18, 2015, now Pat. No. 9,702,271, which
(Continued)

(51) Int. Cl.
| | |
|---|---|
| *F01K 7/16* | (2006.01) |
| *F01K 25/08* | (2006.01) |
| *F01K 13/00* | (2006.01) |
| *F02B 43/08* | (2006.01) |
| *F01K 25/10* | (2006.01) |

(Continued)

(52) U.S. Cl.
CPC .............. *F01K 7/16* (2013.01); *F01K 9/003* (2013.01); *F01K 13/00* (2013.01); *F01K 13/006* (2013.01); *F01K 23/04* (2013.01); *F01K 23/064* (2013.01); *F01K 25/08* (2013.01); *F01K 25/10* (2013.01); *F02B 43/08* (2013.01); *C02F 3/28* (2013.01); *C02F 3/303* (2013.01); *C02F 2209/02* (2013.01); *C02F 2303/10* (2013.01); *Y02E 50/343* (2013.01); *Y02P 20/145* (2015.11);
(Continued)

(58) Field of Classification Search
None
See application file for complete search history.

(56) References Cited

U.S. PATENT DOCUMENTS

| | | | | |
|---|---|---|---|---|
| 4,750,454 A | * | 6/1988 | Santina ................... | F02B 43/08 123/3 |
| 6,510,695 B1 | * | 1/2003 | Fisher ...................... | F02C 6/10 60/39.12 |

(Continued)

*Primary Examiner* — Mark A Laurenzi
*Assistant Examiner* — Wesley G Harris
(74) *Attorney, Agent, or Firm* — Patentizer®, LLC; D. C. Williams

(57) ABSTRACT

Apparatus, systems and methods are provided for the improved use of waste heat recovery systems which utilize the organic Rankine cycle (ORC) to generate mechanical and/or electric power from heat sources generating power from byproducts of water purification process(es). Waste heat energy obtained from heat source(s) is provided to one or more ORC system(s) which may be operatively coupled to electric generator(s). A heat coupling subsystem provides the requisite condensation of ORC working fluid by transferring heat from ORC working fluid to one or more other process(es) or system(s), such as anaerobic digester tank(s), to provide heat energy that enhances the production of fuel for the prime mover(s) without requiring the consumption of additional energy for that purpose.

20 Claims, 9 Drawing Sheets

Related U.S. Application Data is a continuation of application No. 13/758,941, filed on Feb. 4, 2013, now Pat. No. 8,997,490.

(60) Provisional application No. 61/594,168, filed on Feb. 2, 2012.

(51) Int. Cl.
*F01K 9/00* (2006.01)
*F01K 23/04* (2006.01)
*F01K 23/06* (2006.01)
*C02F 3/28* (2006.01)
*C02F 3/30* (2006.01)

(52) U.S. Cl.
CPC .............. *Y02T 10/16* (2013.01); *Y02W 10/30* (2015.05); *Y02W 30/47* (2015.05)

(56) References Cited

U.S. PATENT DOCUMENTS

| | | | |
|---|---|---|---|
| 2010/0093046 A1* | 4/2010 | Remmereit | C02F 3/34 435/134 |
| 2011/0091954 A1* | 4/2011 | Chen | A01H 13/00 435/168 |

\* cited by examiner

HEAT UTILIZATION IN ORC SYSTEMS

RELATED APPLICATIONS

This application is a Continuation-in-Part and claims domestic benefit of co-owned U.S. Nonprovisional patent application Ser. No. 14/625,616 entitled "Heat Utilization in ORC Systems" filed Feb. 18, 2015, which was a Continuation of co-owned Nonprovisional patent application Ser. No. 13/758,941, now U.S. Pat. No. 8,997,490 entitled "Improved Heat Utilization in ORC Systems" filed Feb. 4, 2013, which in turn claimed benefit of co-owned U.S. Provisional Patent Application 61/594,168 entitled "Improved Heat Utilization in ORC Systems" filed Feb. 2, 2012. All three of said applications (Ser. Nos. 14/625,616, 13/758,941, and 61/594,168) are incorporated herein by reference in their entireties for all useful purposes. In the event of inconsistency between anything stated in this specification and anything incorporated by reference in this specification, this specification shall govern.

FIELD OF INVENTION

The present invention relates to the apparatus, systems, and methods of utilizing organic Rankine cycle systems for the generation of power from waste heat sources.

BACKGROUND

Many physical processes are inherently exothermic, meaning that some energy previously present in another form is converted to heat by the process. While the generation of heat energy may be the desired outcome of such a process, as with a boiler installed to provide radiant heat to a building using a network of conduits which circulate hot water to radiators or a furnace used for the smelting of metals, in many other instances unwanted heat is produced as a byproduct of the primary process. One such example is that of the internal combustion engine of an automobile where the primary function is to provide motive force but where the generation of significant unwanted heat is unavoidable. Even in those processes where the generation of heat energy is desired, some degree of residual heat unavoidably escapes or remains which can be managed and/or dissipated. Whether generated intentionally or incidentally, this residual, or waste, heat represents that portion of the input energy which was not successfully applied to the primary function of the process in question. This wasted energy detracts from the performance, efficiency, and cost effectiveness of the system.

With respect to the internal combustion engine common to most automobiles, considerable waste heat energy is generated by the combustion of fuel and the friction of moving parts within the engine. Automobiles are equipped with extensive systems that transfer the heat energy away from the source locations and distribute that energy throughout a closed-loop recirculating system, which usually employs a water-based coolant medium flowing under pressure through jackets within the engine coupled to a radiator across which the imposition of forced air dissipates a portion of the undesired heat energy into the environment. This cooling system is managed to permit the engine to operate at the desired temperature, removing some but not all of the heat energy generated by the engine.

As a secondary function, a portion of the heat energy captured by the engine cooling system may be used to indirectly provide warm air as desired to the passenger compartment for the operator's comfort. This recaptured and re-tasked portion of the waste heat energy generated as a byproduct of the engine's primary function represents one familiar example of the beneficial use of waste heat.

Very large internal combustion engines are widely used in heavy industry in numerous applications. For example, General Electric's Jenbacher gas engine division produces a full range of engines with output power capabilities ranging from 250 kW to over 4,000 kW (by comparison, a typical mid-class automobile engine produces about 150 kW of usable output power). The Jenbacher engines can be powered by a variety of fuels, including but not limited to natural gas, biogas (such as provided by anaerobic digestion), and other combustible gasses including those from landfills, sewage, and coal mines. One common use of large combustion engines, such as the Jenbacher model 312 and 316 engines, is to co-locate them at a biogas generation facility. This consolidates, at one location, (i) the elimination of biodegradable waste products that release chemical energy in the form of combustible biogas and (ii) the capture and combustion of the biogas in large combustion engines to generate useful power.

These engines are frequently employed to drive electric power generators, converting the rotational mechanical energy from the energy of combustion into electrical energy. One such example of an anaerobic digestion system specifically designed for the generation of electric power from biogas is offered by Harvest Power of Waltham, Mass.

In operation, these engines generate tremendous amounts of waste heat energy that has historically been dissipated into the environment. In the case of the combined Jenbacher model 316 engine and generator system with a maximum electric power output of approximately 835 kW, approximately 460 kW of heat energy is lost in the exhaust gas (at an approximate temperature of 950° F.) and approximately another 570 kW is lost in the cooling system (with a typical jacket water coolant temperature of approximately 200° F.). From this data, it can be seen that less than half of the system's power output is in the desired form (in this case, electric power output from the system generator). Unless recaptured and repurposed, however, the portion of the input energy converted to heat is lost. In many prior art systems, this heat energy is lost and additional energy is required to cool the recirculating jacket water. The heat from exhaust gas generally escapes into the atmosphere, and the recirculating jacket water is cooled by an outboard apparatus (such as by large external condensing radiators driven by forced air sources), which consume additional electric power to function and further reduce the efficiency of the system.

Additionally, the dissipation of this waste heat energy into the environment can have deleterious effects. Localized heating may adversely affect local fauna and flora and can require additional power, either generated locally or purchased commercially, to provide additional or specialized cooling. Further, the noise generated by forced air cooling of the jacket water heat radiators can have undesirable secondary effects.

With regard to engines fueled by anaerobic-digestion-generated biofuel, a variety of techniques, including the use of electrical heating systems, have been employed to provide heat energy to anaerobic digestion processes necessary for relatively efficient generation of biogas by heated microorganisms. These systems consume considerable energy and therefore have an attendant cost of operation and maintenance. For example, the anaerobic digester heating systems offered by Walker Process Equipment of Aurora, Ill. produce hot water in excess of 160° F. using electric power with boilers fueled by biogas, natural gas, or fuel oil as input energy. In addition to the energy consumed to provide this hot water, additional electric energy must be consumed to manage the waste heat from this apparatus.

Waste heat energy systems employing the organic Rankine cycle (ORC) system have been developed and employed to recapture waste heat from sources such as the Jenbacher 312 and 316 combustion engines. One typical prior art ORC system for electric power generation from waste heat is depicted in FIG. 1. Heat exchanger 101 receives a flow of a heat exchange medium in a closed loop system heated by energy from a large internal combustion engine at port 106.

For example, this heat energy may be directly supplied from the combustion engine via the jacket water heated when cooling the combustion engine, or it may be coupled to the ORC system via an intermediate heat exchanger system installed proximate to the source of exhaust gas of one or more combustion engines. In either event, heated matter from the combustion engine or heat exchanger is pumped to port 106 or its dedicated equivalent. The heated matter flows through heat exchanger 101 and exits at port 107 after transferring a portion of its latent heat energy to the separate but thermally coupled closed loop ORC system which typically employs an organic refrigerant as a working fluid. Under pressure from the system pump 105, the heated working fluid, predominantly in a gaseous state, is applied to the input port of expander 102, which may be a positive displacement machine of various configurations, including but not limited to a twin screw expander or a turbine. Here, the heated and pressurized working fluid is allowed to expand within the device, and such expansion produces rotational kinetic energy that is operatively coupled to drive electrical generator 103 and produce electric power which then may be delivered to a local, isolated power grid or the commercial power grid. The expanded working fluid at the output port of the expander, which typically is a mixture of liquid and gaseous working fluid, is then delivered to condenser subsystem 104 where it is cooled until it has returned to a sufficiently liquid state.

The condenser subsystem sometimes includes an array of air-cooler radiators or another system of equivalent performance through which the working fluid is circulated until it reaches the desired temperature and state, at which point it is applied to the input of system pump 105. System pump 105 provides the motive force to pressurize the entire system and supply the liquid working fluid to heat exchanger 101, where it once again is heated by the energy supplied by the combustion engine waste heat and experiences a phase change to its gaseous state as the organic Rankine cycle repeats. The presence of working fluid throughout the closed loop system ensures that the process is continuous as long as sufficient heat energy is present at input port 106 to provide the requisite energy to heat the working fluid to the necessary temperature. See, for example, Langson U.S. Pat. No. 7,637,108 ("Power Compounder") which is hereby incorporated by reference.

As a result of the transfer of waste heat energy from the combustion engine to the ORC system, these types of prior art ORC systems serve two functions. They convert this waste heat energy, which would otherwise be lost, into productive power and they simultaneously provide a beneficial, and sometimes a necessary, cooling or condensation function for the combustion engine. In turn, the ORC system's shaft output power has been used in a variety of ways, such as to drive an electric power generator or to provide mechanical power to the combustion engine, a pump, or some other mechanical apparatus.

ORC systems can extract as much useful heat energy as is practicable from one or more waste heat sources (often referred to as the "prime mover"), but owing to various physical limitations they cannot convert all available waste heat to mechanical or electric power via the expansion process discussed above. Similar in some respects to the cooling requirements of the prime mover, the ORC system requires post-expansion cooling (condensation) of its working fluid prior to repressurization of the working fluid by the system pump and delivery of the working fluid to the heat exchanger. The heat energy lost in this condensation process, however, represents wasted energy which detracts from the overall efficiency of the system.

Some prior art combined prime mover/ORC engine applications have utilized heat generated by the ORC condensation process in a conventional ORC system condenser while simultaneously providing power (electrical and/or mechanical) for various purposes. Combined heat and power ("CHP") ORC systems have typically fulfilled a secondary purpose by using a portion of the heat energy from the prime mover and/or heat energy remaining in the post-expansion working fluid. FIG. 5 depicts a prior art ORC system including combustion engine heat energy output port 501 and condenser heat energy output port 502.

In one prior art ORC application, residual heat extracted from a dedicated ORC condenser during the cooling of post-expansion ORC working fluid at condenser heat energy output port 502 is used to provide domestic hot water, radiant heating, or both. This process requires the use of a conventional ORC condenser system well known in the art. The energy flow of such an application is depicted in the block diagram of FIG. 6. Here, a heat generating engine 601 is operatively coupled to electric generator 602 and provides waste heat energy 603 to the ORC system 604, which is operatively coupled to drive electric generator 605. Heat energy from the prime mover 601 is delivered to heat energy output port 501 and, in some prior art systems, is extracted to (i) a first heat energy input port 606 (such as for radiant heating) and (ii) a second heat energy input port 607 (such as for hot water heating). In those ORC systems known by the applicants, the utilization of residual heat from the post-expansion working fluid is intentionally extracted from the system but is not utilized for further system optimization of the prime mover or, for example, for heating a production material such as microorganisms to generate biofuel.

BRIEF SUMMARY OF SOME ASPECTS OF DISCLOSURE

The applicants have invented apparatus, systems, and methods that productively utilize heat energy generated by ORC working fluid condensation to produce fuel or other power or energy for use by the prime mover. In some embodiments, the prime mover can use the fuel, power, or energy to drive a prime mover.

In certain embodiments, the system includes: (i) a biogas generation system providing combustible biogas to fuel the prime mover; (ii) a prime mover that provides heat energy to drive an ORC engine; and (iii) an ORC engine that provides heat energy to drive the biogas generation system. In some embodiments, the biogas generation system utilizes an anaerobic digestion process which can utilize ORC heat energy to maintain the temperature for the anaerobic process to take place.

In some embodiments, the prime mover may provide mechanical power to drive one or more electric generators. In some embodiments, such generators can be connected to a power distribution grid.

In some applications, the biogas generation system can be co-located with prime mover and ORC system(s) so that (i) one or more prime mover(s) provide waste heat to drive one or more co-located ORC system(s), (ii) one or more ORC system(s) provides waste heat to microorganisms to drive the co-located biogas generation system, and (iii) resulting biogas can provide fuel for one or more co-located prime mover(s). In some of these applications, one or more prime mover(s) and one or more ORC system(s) can simultaneously provide productive power for an of a wide variety of devices and applications, locally or otherwise. Alternatively or in addition, the ORC system(s) may provide waste heat to co-located heat consuming system(s) other than biogas generation system(s). In some applications, the prime mover may receive fuel from more than one source. For example, a prime mover may run on locally-generated biogas during a portion of its operating schedule and another fuel during other portions of its operating schedule. Such other fuels may include but are not limited to stored biogas, biogas imported from other sources, other forms of combustible gasses, or alternate fuels (liquid, solid, or gaseous) suited to the requirements of the prime mover. In some applications, fuels from multiple sources may be mixed together and that mixture supplied to the prime mover. This technique would allow the operator to control the composition of the fact and the exhaust emissions of the prime mover based in its availability and to maximize performance and cost efficiency of its operation.

In some instances, waste heat energy obtained from the exhaust gasses and/or cooling jacket water of the prime mover is provided to one or more ORC system(s) which are operatively coupled to one or more separate electrical generator(s) that are similarly connected to the commercial power distribution grid. The heat coupling subsystem can comprise a heat exchanger which is operatively coupled to provide the requisite condensation of ORC working fluid by transferring heat energy from said fluid to one or more anaerobic digester tank(s). That heat energy can help optimize production of biogas from the anaerobic digestion process used to power the prime mover, and, when operated in concert with an ORC system also generating electric power, improve the efficiency of, and maximize the economic benefit of, the combined system.

The prime mover of some embodiments can be any system, apparatus, or combination of apparatus, that converts some or all of its input energy into heat energy or waste heat energy in a form and quantity sufficient for use by one or more ORC system(s). In some embodiments, the only purpose of the prime mover will be to generate heat for the ORC system(s). All heat energy sources co-located, compatible for use with, and utilized by one or more ORC system(s) fall within the scope of the term "waste heat" for the purpose of this application.

In some systems, a prime mover can generate and deliver mechanical power to an electric power generator in addition to providing waste heat energy for the ORC system(s). In certain embodiments, a prime mover can simultaneously generate more than one form of waste heat, including but not limited to cooling water, hot exhaust gas, or radiated heat. The waste heat energy may be captured and provided to the ORC system in any practicable manner, either directly or via one or more intermediate heat exchanger systems.

In some instances, one or more prime movers may provide waste heat energy to one or more ORC systems. In some embodiments, a single heat exchanger may be employed for any ORC system, any prime mover, any source of heat energy from each prime mover, or for more than one ORC system, prime mover, or heat energy source. These heat exchangers may have separate input ports and separate output ports for the energy source(s) or a single input and/or output port may be utilized for more than one source.

In certain embodiments, one or more ORC system(s) operate with a closed loop refrigerant cycle to prevent intermixture of working fluid between systems. Similarly, in some instances one or more prime mover(s) operate with a closed loop jacket water cooling system to prevent any intermixture of jacket water between systems. In other embodiments, a single exhaust gas heat recovery system is employed to recover waste heat energy from more than one prime mover and provide such heat energy to more than one associated ORC system. In some embodiments, a heat recovery system receives heat energy input from one or more sources and/or provides heat energy to more than one ORC system.

In some systems, one or more additional heat sources provide heat input to the ORC system(s). For example, a portion of the biogas generated by the anaerobic digestion process may be burned a separate boiler and used to provide heat input to the ORC system(s) in addition to, or in lieu of, waste heat input from one or more prime mover(s).

in certain embodiments, a portion of the waste heat energy from the prime mover may be applied directly to the anaerobic digestion process without having been first applied to the ORC system(s). This can be beneficial in the event that the anaerobic digestion heating requirements exceed the residual heat energy available from the post-expansion working fluid in the ORC system(s).

In some applications, one or more ORC systems constitute the entire jacket water cooling system for the prime mover(s). In such cases, the ORC systems may replace alternative prime mover cooling systems, which consume, rather than generate, power during operation and therefore usually have a significant cost of operation in addition to their cost of installation. Such power consuming dedicated prime mover cooling systems typically have a significantly larger footprint than an ORC system; and therefore they may have additional physical space requirements at the generation facility. They may also generate noise and unwanted environmental heat pollution as a consequence of operation. Employing one or more ORC system(s) in lieu of power consuming dedicated prime mover cooling systems, which are net consumers of power under such circumstances, can be economically, physically, and environmentally beneficial.

In some embodiments, the waste heat recovery system(s) include one or more power generating system, which may be ORC system(s), and one or more power receiving apparatus, which may be but are not limited to electric power generator(s), prime mover(s), pump(s), combustion engine(s), fan(s), turbine(s), compressor(s), and the like. The rotational mechanical power generated by the power generating system(s) is delivered to the power receiving component.

In some embodiments, the ORC system(s) provide a portion of the cooling system for the prime mover(s) and operate in conjunction with one or more additional cooling system(s). In some embodiments, electric power generated by the ORC systems may be applied to the operation of said additional cooling systems for the prime mover as well as provide electric power for other purposes at the site or elsewhere. This can be particularly advantageous if, for example, the prime mover is configured to solely provide mechanical power output and a commercial source of electric power is not readily available.

In some embodiments, one or more ORC system(s) may provide heat energy to one or more anaerobic digestion tanks or other anaerobic digestion structure. In some instances, multiple ORC systems can provide heat energy to a single anaerobic digestion tank. In some embodiments, the anaerobic digestion heating system includes the entire condenser subsystem for the ORC system(s). In other embodiments, the anaerobic digestion heating system comprises a portion of the ORC condenser subsystem(s) in combination with one or more other condensing system(s) which may operate on a regular or intermittent basis dictated by a number of factors including seasonal requirements. The ambient environmental conditions, the number of ORC systems and their ratings, and/or the number, configuration, location, or volume of the anaerobic digestion tanks may each be factors in determining the configuration and operation of the condenser portion of the ORC systems.

In some embodiments, the heat energy supplied by the ORC system to the anaerobic digestion process can reduce or even completely obviate the need for a supplemental anaerobic digestion tank heating system. In some instances, this can reduce or even eliminate the cost of installation, maintenance, and operation of such supplemental system, including costs associated with electric power and/or other fuels which may have previously been consumed by its operation. In some cases, the ORC system can provide heat to the anaerobic digestion process in combination with one or more other heating systems, which can serve to reduce rather than eliminate the attendant costs.

In some embodiments, the ORC system supplies all heat required by the anaerobic digestion system via the transfer of heat energy from the ORC process. In some embodiments, some or all of the electric power generated by the ORC system can be supplied to electrical heating systems to heat the anaerobic digestion tank(s). This heating can be in addition to, or in lieu of, the direct transfer of heat energy from the ORC system to the anaerobic digestion system and can vary based on factors such as the availability of heat energy and/or other electrical power, heating requirements, and the like. In some embodiments, a portion of electric power output generated by the ORC system is supplied to other components or systems operatively connected (either electrically, mechanically, or thermally) to the combined ORC and anaerobic digestion system, including but not limited to other heating systems, cooling systems, fans, pumps, compressors, circulation systems, filtration equipment, stirring systems, and the like.

The foregoing is a brief summary of only some of the novel features, problem solutions, and advantages variously provided by the various embodiments. It is to be understood that the scope of the invention is to be determined by the claims as issued and not by whether a claim addresses an issue noted in the Background or provide a feature, solution, or advantage set forth in this Brief Summary. Further, there are other novel features, solutions, and advantages disclosed in this specification; they will become apparent as this specification proceeds.

BRIEF DESCRIPTION OF THE DRAWINGS

Without limiting the invention to the features and embodiments depicted, certain aspects this disclosure, including the preferred embodiment, are described in association with the appended figures in which;

FIG. 2D is a block diagram of an embodiment of this invention comprising multiple heat exchangers and valve(s) operative to apportion heat energy there between;

DETAILED DESCRIPTION OF THE PREFERRED AND OTHER EMBODIMENTS

The process of anaerobic digestion is well known in the art. Certain strains of bacteria, in the absence of oxygen, are employed to break down, or digest, certain biodegradable material including food, yard, or other waste into byproducts such as combustible gasses consisting of methane, hydrogen, and other trace components, as well as a residual solid effluent byproduct. This effluent, or sludge, contains ammonia, phosphorous, potassium, and other trace materials and is beneficial to agriculture as a supplemental enrichment fertilizer for soil or as a resource suitable for combustion fuel to generate heat energy for any useful purpose.

The anaerobic digestion process involves three basic stages involving different microorganisms, and the temperature of the cultures can play a very significant role in the efficiency of the digestion process. Mesophilic digestion, occurring at medium temperatures, can be applied to discrete batches of biodegradable waste while thermophilic digestion, occurring at higher temperatures, may preferably be utilized on a continuous basis. Although the anaerobic digestion microorganisms can survive within the range from below freezing to above 135° F., optimal digestion occurs at 98° F. for mesophilic organisms and 130° F. for thermophilic organisms. Bacterial activity and therefore biogas production is significantly reduced at greater temperatures and declines at a somewhat lesser rate at cooler temperatures. The requirement for heating of the cultures may vary over time (over the course of a single day and, as seasons change, throughout the year) based on ambient temperatures.

Figure 1:
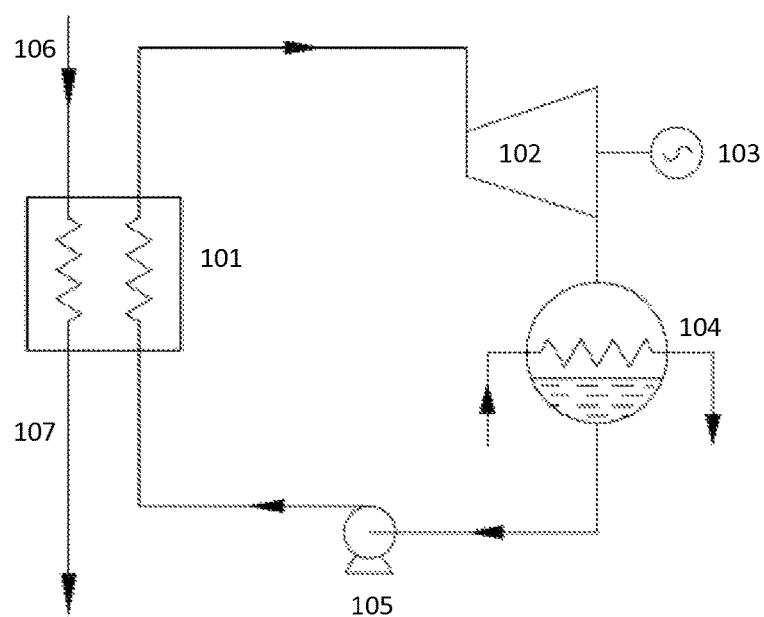
FIG. 1 is a block diagram of a prior art ORC system used to convert waste heat energy into electric power.
Figure 2A:
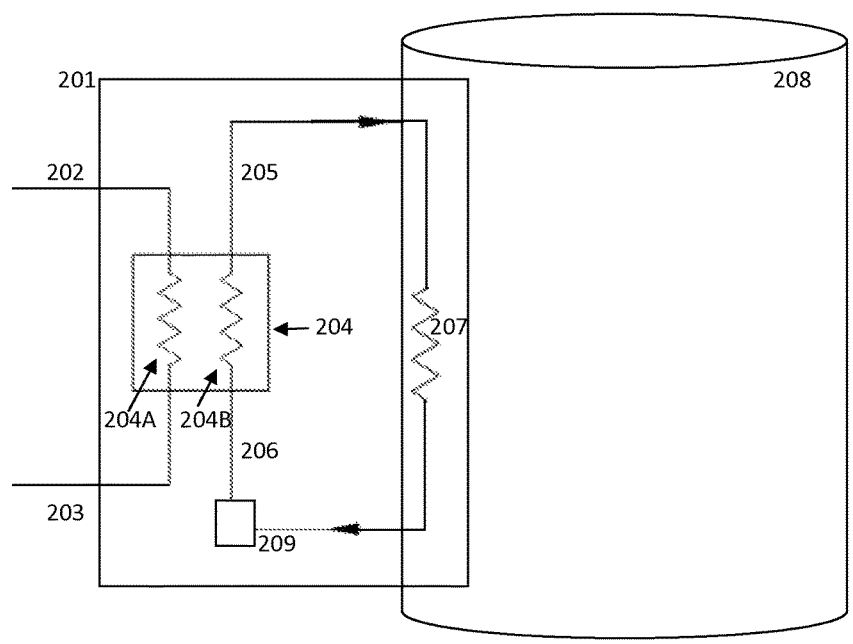
FIG. 2A is a block diagram of a heat coupling subsystem with heat exchangers to transfer heat energy from a closed loop system to an anaerobic digestion tank.

With reference now to FIG. 2A, a heat coupling subsystem 201 can be used to transfer heat energy to the anaerobic digestion process while maintaining media isolation between a heat source and an anaerobic digestion system in the heating tank 208, owing to potentially different media requirements of the two systems. The heat coupling subsystem 201 includes (i) an intermediate heat exchanger 204, (ii) an anaerobic digestion tank heat exchanger 207 within, as part of the wall of, or otherwise in direct thermal communication with, the anaerobic digestion tank 208, (iv) pumping apparatus 209 between the tank heat exchanger 207 and the intermediate heat exchanger 204, (v) operative coupling between the various components described below, and (vi) secondary media (which may be the same as or different from the primary medium depending on system requirements) flowing within the isolated closed loop provided by the tank-side (secondary) portion of the heat coupling subsystem 201 via the input port 206 and the output port 205, the anaerobic digestion tank heat exchanger 207, and the pumping apparatus 209. Heat coupling subsystem 201 may also include storage reservoirs (not shown) for a quantity of both the primary medium and the secondary medium as necessary to insure that sufficient media is available for the proper operation of each closed loop systems on the primary and secondary sides.

The primary side of the intermediate heat exchanger 204 includes a primary side input port 202 to receive the heated primary media (not shown) from the heat source, which may be an ORC system, a prime mover, or any other source of heat energy, a primary side heat exchanger section 204A, and a primary side output port 203. This flow provides heat energy from the ORC system for transfer to, and use by, the anaerobic digestion tank(s), e.g., 208. The heated primary media can be ORC working fluid, water, a mixture of water and ethyl glycol, a mixture of water and one or more other components, or any other fluid or gaseous substance compatible with the application and apparatus. The heated primary media passes through the primary side 204A of intermediate heat exchanger 204 and exits at primary side exit port 203. Heat energy from the heated primary media is transferred to the secondary side of the intermediate heat exchanger 204, through which a suitable secondary media (not shown) enters at secondary side input port 206, flows through secondary side heat exchanger section 204B, and exits at secondary side output port 205. This heated secondary media then flows through anaerobic digestion tank heat exchanger 207, where heat energy is transferred from the heated secondary media to the contents of anaerobic digestion tank 208 before being pressurized by pumping apparatus 209 and returned to secondary side of the intermediate heat exchanger 204 at the secondary side input port 206.

Figure 2B:
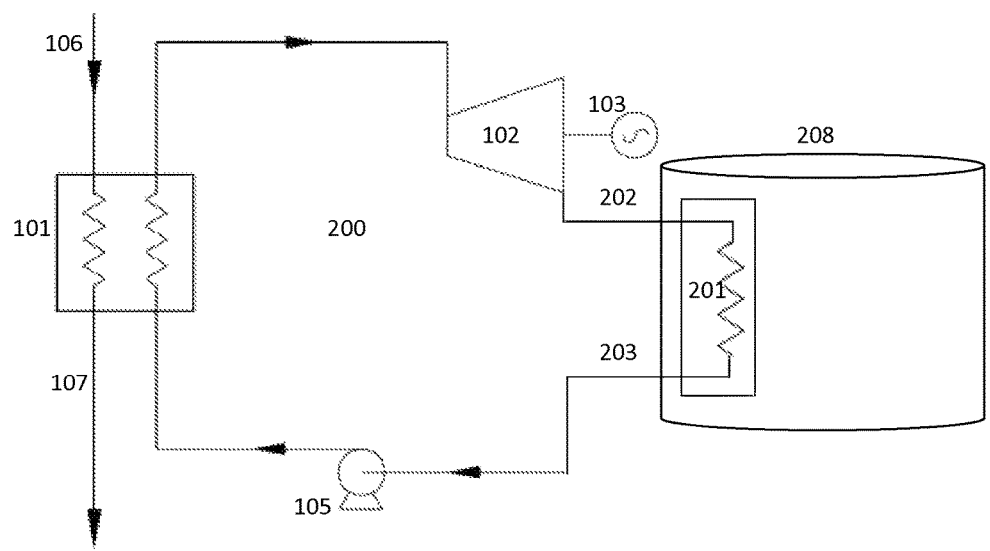
FIG. 2B is a block diagram of a single ORC system used to convert waste heat energy into electric power while simultaneously providing heat energy to a single anaerobic digestion tank that provides condensing functionality for the ORC system.

With reference now to FIG. 2B, an ORC system, generally 200, utilizes the heat coupling subsystem 201 within, as part of the wall of, or otherwise in direct thermal communication within anaerobic digestion tank 208 to provide cooling for the post-expansion working fluid exiting from the expander 102. The ORC working fluid exits the expander 102 and enters input port 202, travels through the heat coupling subsystem 201, and then exits the output port 203 and enters the system pump 105. The heat coupling subsystem 201 and anaerobic digestion tank 208 therefore provide an integrated working fluid condensation and heat consumption system. That is, the anaerobic digestion tank heat exchanger 207, when coupled to the ORC system via intermediate heat exchanger 204 in the manner shown in FIG. 2A and described in detail above, comprise heat coupling subsystem 201 which may be considered to function as a single heat exchanger for the purposes of the ORC system. Analogous to the performance of a transformer in an electrical system, heat coupling subsystem 201 serves as a "thermal transformer" which transfers heat energy from its primary (ORC) side to its secondary (tank) side while maintaining isolation between the separate media flowing in each closed loop. This provides the equivalent performance of a condenser known in the prior art with significant improvements. This particular system is also a production system, meaning that the heat coupling subsystem 201 provides heat energy, via anaerobic digestion tank heat exchanger 207, directly for production and not for mere disposition of the heat as waste. In this example, the anaerobic digestion tank heat exchanger 207 directly heats the contents of the anaerobic digestion tank 208, yielding production of biogas. The temperature of the post-expansion working fluid entering input port 202 should be about 125° F., which is nearly ideal for the purpose of supplying heat to a continuous mesophilic anaerobic digestion process including the heat energy losses from an intervening intermediate heat exchanger.

Referring to both FIGS. 2A and 2B, in an embodiment utilizing an intermediate heat exchanger 204, less heat energy will be delivered to the anaerobic digestion tank(s) than is provided to the primary side, i.e., through input port 202, of heat coupling subsystem 201 due to the unavoidable loss of heat energy during the heat transfer process from the primary medium to the secondary medium via intermediate heat exchanger 204. However, for applications with reduced anaerobic digestion heating requirements, such as mesophilic digestion processes, this loss of heat energy can be beneficial and can eliminate the requirement for a dedicated supplemental condensing apparatus. This method may be applied to any configuration of the anaerobic digestion heating apparatus.

Figure 2C:
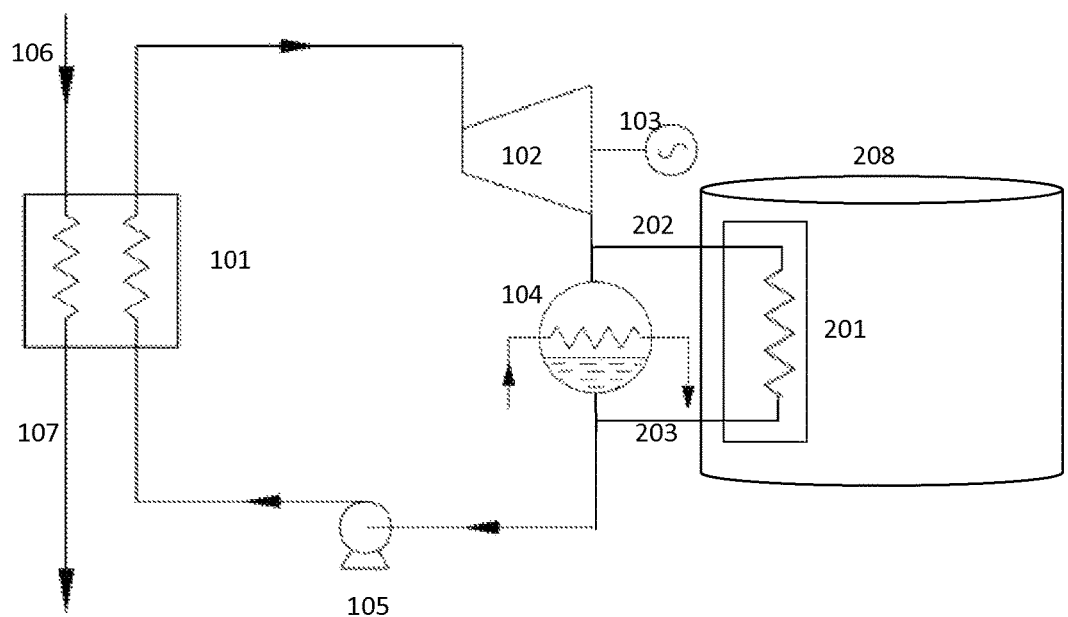
FIG. 2C is a block diagram of a single ORC system used to convert waste heat energy into electric power while simultaneously providing heat energy to a single anaerobic digestion tank that provides partial condensing functionality for the ORC system, augmented by the presence of a separate condenser.

With reference now to FIG. 2C, the structure and operation of the system is identical to that of FIG. 2B with the addition of an ORC condenser subsystem 104 between the input port 202 and the outlet port 203. Condenser subsystem 104 functions as a heat exchanger removing energy from the post-expansion working fluid to restore the working fluid to a sufficiently liquid state. The energy removed from the working fluid, in the form of heat, is transferred to an alternate medium, such as air or a liquid, for removal from the ORC system. In this embodiment comprising both heat coupling subsystem 201 and condenser subsystem 104, post-expansion ORC working fluid can thus travel through either or both (i) the condenser subsystem 104 and (ii) the heat coupling subsystem 201 associated with the anaerobic digestion tank 208. This embodiment may be used when insufficient condensing capacity might be provided by the anaerobic digestion tank 208 or during periods of ORC operation when the anaerobic digestion tank 208 is not in service. This embodiment permits the flow of post-expansion working fluid directly from the outlet port 203 of the expander 102 directly to either condenser subsystem 104 or through heat coupling subsystem 201. This will generally provide the greatest temperature working fluid to heat coupling subsystem 201 and will permit complete disassociation of heat coupling subsystem 201 from ORC operation via the use of appropriate valves (not shown) at the junctions of heat coupling subsystem 201 and the inlet and outlet of condenser subsystem 104. Condenser subsystem 104 may generally be any type of condenser system best suited for the particular application and factors that govern the installation and operation of the ORC system, including but not limited to the mass flow rate of working fluid in the ORC system, ambient temperature conditions including both diurnal and seasonal variations, equipment footprint, installation and maintenance cost, and the like. In one embodiment, condenser subsystem 104 may comprise one or more air cooled radiators with forced air, as the medium, being driven through the radiator(s) by one or more fans. In one embodiment, condenser subsystem 104 may comprise one or more radiators wherein a flow of a liquid medium is in heat transfer communication with the post-expansion working fluid. In both embodiments, the media is either discharged from the system or circulated and adequately cooled in a separate system. All other configurations of condensing subsystems known in the art and applicable to ORC systems are also envisioned by this disclosure.

Figure 2D:
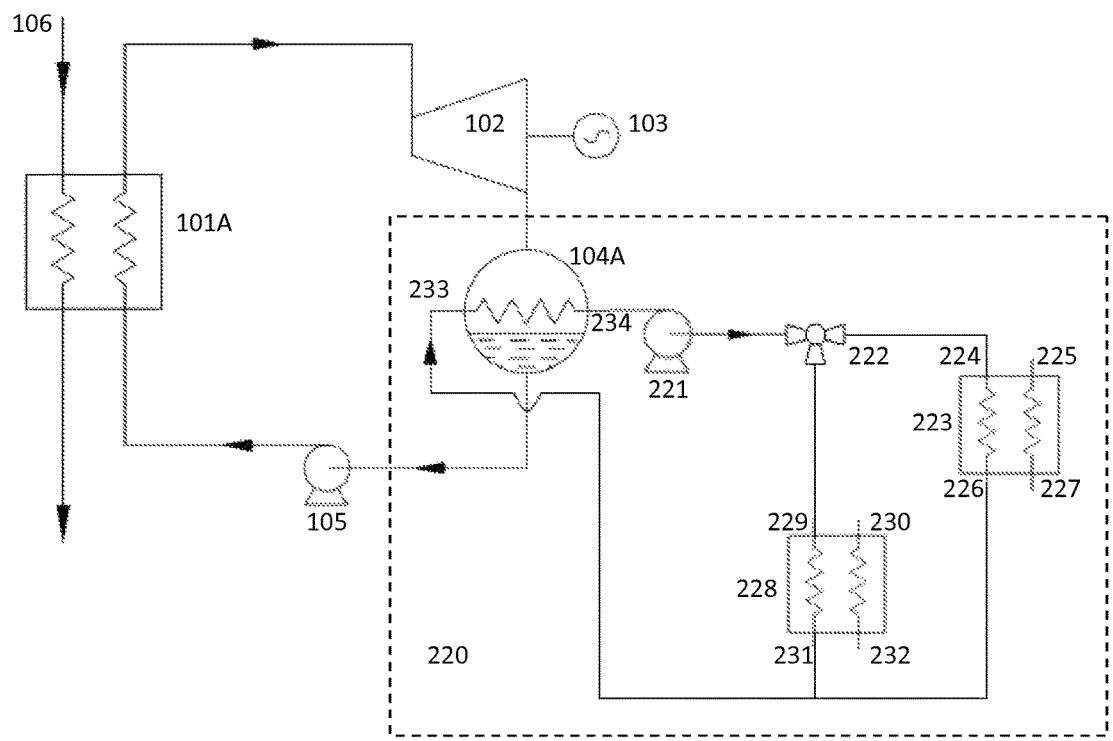

In a related embodiment shown in FIG. 2D, a condensing transfer system 220 comprises an intermediate heat transfer unit 104A, condensing subsystem pump 221, one or more valve(s) 222, anaerobic digester heat exchanger 223, and one or more secondary heat exchanger(s) 228, all in heat energy transfer communication via a separate condenser heat transfer medium flowing between said elements. Post-expansion working fluid is conveyed to condensing transfer system 220 via intermediate heat transfer unit 104A through which the separate condenser heat transfer medium, in heat transfer receiving communication with the working fluid, is circulated via motive force provided by condensing subsystem pump 221. Said medium is separate from the ORC working fluid and may comprise water, oil, an organic refrigerant, an inorganic compound, or any other fluid or combinations of fluids of suitable performance to accept heat energy from the working fluid and provide said heat energy to one or more condensing subsystems comprising the remainder of condensing transfer system 220. Heat energy is transferred from the post-expansion working fluid to the condenser heat transfer medium in intermediate heat transfer unit 104A, thereby heating the condenser heat transfer medium and restoring the post-expansion working fluid to a sufficiently liquid state suitable for pressurization by system pump 105 for reheating and subsequent expansion in the ORC system as described elsewhere herein.

Condensing subsystem pump 221 provides pressurization of the heated condenser heat transfer medium necessary to convey said heated medium to heat exchangers 223, 228, and others similarly connected via the one or more valve(s) 222 that permit the flow of heated condenser heat transfer medium to be controllably distributed in any desired proportion as necessary and desirable for system optimization. One or more valve(s) 222 are configured receive the condenser heat transfer medium from pump 221 and direct all of said heated condenser heat transfer medium to any one of said heat exchangers, direct any portion of said heated condenser heat transfer medium to any one heat exchanger and any other portion(s) to any other heat exchanger(s), or to direct no heated condenser heat transfer medium to any one or more than one of the heat exchangers. However, as described below, at least a portion of heated condenser heat transfer medium must be directed to at least one heat exchanger. In this manner, the most efficient and effective use of the heat energy removed from the post-expansion working fluid may be realized.

FIG. 2D depicts anaerobic digester heat exchanger 223 in heated condenser heat transfer medium receiving communication with valve(s) 222. In one embodiment, anaerobic digester heat exchanger 223 may be intermediate heat exchanger 201 disclosed elsewhere herein and depicted in FIG. 2A as being a component of heat coupling subsystem 201. In this embodiment, primary side input port 202 and primary side output port 203 of intermediate heat exchanger 201 correspond to primary side input port 224 and primary side output port 226, respectively, of anaerobic digester heat exchanger 223. Further, secondary side input port 206 and secondary side output port 205 of intermediate heat exchanger 201 correspond to secondary side input port 227 and secondary side output port 225 of anaerobic digester heat exchanger 223. The primary and secondary sides of anaerobic digester heat exchanger 223 are in thermal transfer communication, allowing heat energy to be transferred from the heated condenser heat transfer medium in the primary side to a separate medium flowing in the secondary side. Said separate medium may comprise water, oil, an organic refrigerant, an inorganic compound, or any other fluid or combination of fluids of suitable performance. The remaining components of intermediate heat exchanger 201 may be identically configured as described and depicted in FIG. 2A in this embodiment.

In one embodiment, anaerobic digester heat exchanger 223 may be configured to provide heat energy to an anaerobic digestion tank in any other manner described herein or otherwise known in the art. By way of example and not limitation, anaerobic digester heat exchanger 223 may be used in conjunction with the embodiments depicted herein as FIG. 3, 4, 8, 9 or 10.

FIG. 2D also depicts secondary heat exchanger(s) 228 in heated condenser heat transfer medium receiving communication with valve(s) 222. Here, primary side input port 229 receives a flow of heated condenser heat transfer medium from valve(s) 222 which passes through the primary side of secondary heat exchanger(s) 228 and exits at output port 231. An additional and separate heat transfer medium, which may comprise water, oil, an organic refrigerant, an inorganic compound, or any other fluid or combination of fluids of suitable performance, enters the secondary side of secondary heat exchanger(s) 228 at input port 232, passes through the secondary side of secondary heat exchanger(s) 228, and exits at output port 230. The primary and secondary sides of secondary heat exchanger(s) 228 are in thermal transfer communication, thereby allowing heat energy to be transferred from the heated condenser heat transfer medium in the primary side to the separate medium flowing in the secondary side. In this manner, heat energy from the heated condenser heat transfer medium is transferred to the separate medium and thereby removed from condensing transfer system 220.

Although only one exemplary secondary heat exchanger 228 is depicted in FIG. 2D for clarity, it should be understood that the instant disclosure provides for more than one such heat exchanger in a similar or functionally equivalent arrangement (not shown). Additional valve(s) 222 may be utilized to provide a controllable portion, ranging from none to all, of the heated condenser heat transfer medium from said valves to any of one or more heat exchanger(s) 228 deemed necessary or desirable to provide sufficient cooling for the ORC system and to provide and utilize heat for any other desired purpose known in the art or later developed.

In one embodiment, secondary heat exchanger(s) 228 comprise one or more air cooled radiators subjected to forced air cooling provided by electric fans. In this manner, heat energy from the heated condenser heat transfer medium is transferred to the forced air flow and thereby removed from condensing transfer system 220. Said electric fans may be powered by electric power from a commercial power grid, by electric power provided by one or more generator(s) driven by mechanical power derived from the ORC expander(s), by electric power provided by another local generator associated with the prime mover(s) or anaerobic digestion system, by mechanical power provided directly or indirectly by a rotating shaft in or associated with one or more ORC expander(s), by mechanical power provided directly or indirectly by another rotating shaft in or associated with the prime mover(s) or anaerobic digestion system, or by any other preferred source of electric or mechanical power.

In one embodiment, secondary heat exchanger(s) 228 comprise one or more liquid cooled radiators through which a flow of cooling liquid, including but not limited to water, is passed through the secondary side in heat energy receiving communication with the heated condenser heat transfer medium flowing in the primary side such that heat energy from the heated condenser heat transfer medium is transferred to cooling liquid and thereby removed from condensing transfer system 220. In one embodiment, the cooling liquid may be cooled via any preferred means and re-circulated back to the secondary side of secondary heat exchanger(s) 228 in a closed-loop circuit. In an alternative embodiment, and preferably when the cooling liquid is water, when a large supply of water is available, and when the discharge of water heated by the condenser heat transfer medium is both feasible and preferred, no attempt is made to intentionally cool and re-circulate the cooling water. For example, cooling water may be extracted from a source such as, but not limited to, a well, a pond, or a large reservoir, provided to secondary heat exchanger(s) 228 for cooling purposes, and then discharged back into the same source or a different source. In one embodiment, such cooling water may be extracted at or near a cool point of the source and, after passing through secondary heat exchanger(s) 228, be discharged at or near a warm point. In warm summer months, the coolest point may be at the greatest depth of the source and the warmest point may be at the surface. In cold winter months, the upper surface of the source may be at or near freezing temperatures while the warmest point may be at the greatest depth. In the latter case, even the warmest temperature will likely be sufficient for use by secondary heat exchanger(s) 228, and discharging water warmed by the heat transfer process at the surface may be preferred to prevent the source from freezing. Any preferred combinations of water extraction and return are obvious to a person of ordinary skill in the art and are therefore envisioned by this disclosure. In this manner, the temperature characteristics of the source of cooling water may be controlled to some degree, although such control is a potential advantage secondary to that of the energy conversion and creation advantages described elsewhere herein. Although extracting and returning the water to and from, respectively, the same source allows for some or all of the same water to be used more than once, the open nature of this arrangement is distinguishable from the recirculating closed loop embodiment described above because new (additional) water may be added and previously-used water may be removed from the system at any time, including via evaporation, unlike in a typical closed loop system where a finite quantity of water is re-circulated without addition or subtraction in the normal course of operation. In one embodiment, water obtained for cooling from one source may be returned to a different source whenever beneficial for any other secondary purpose.

Figure 3:
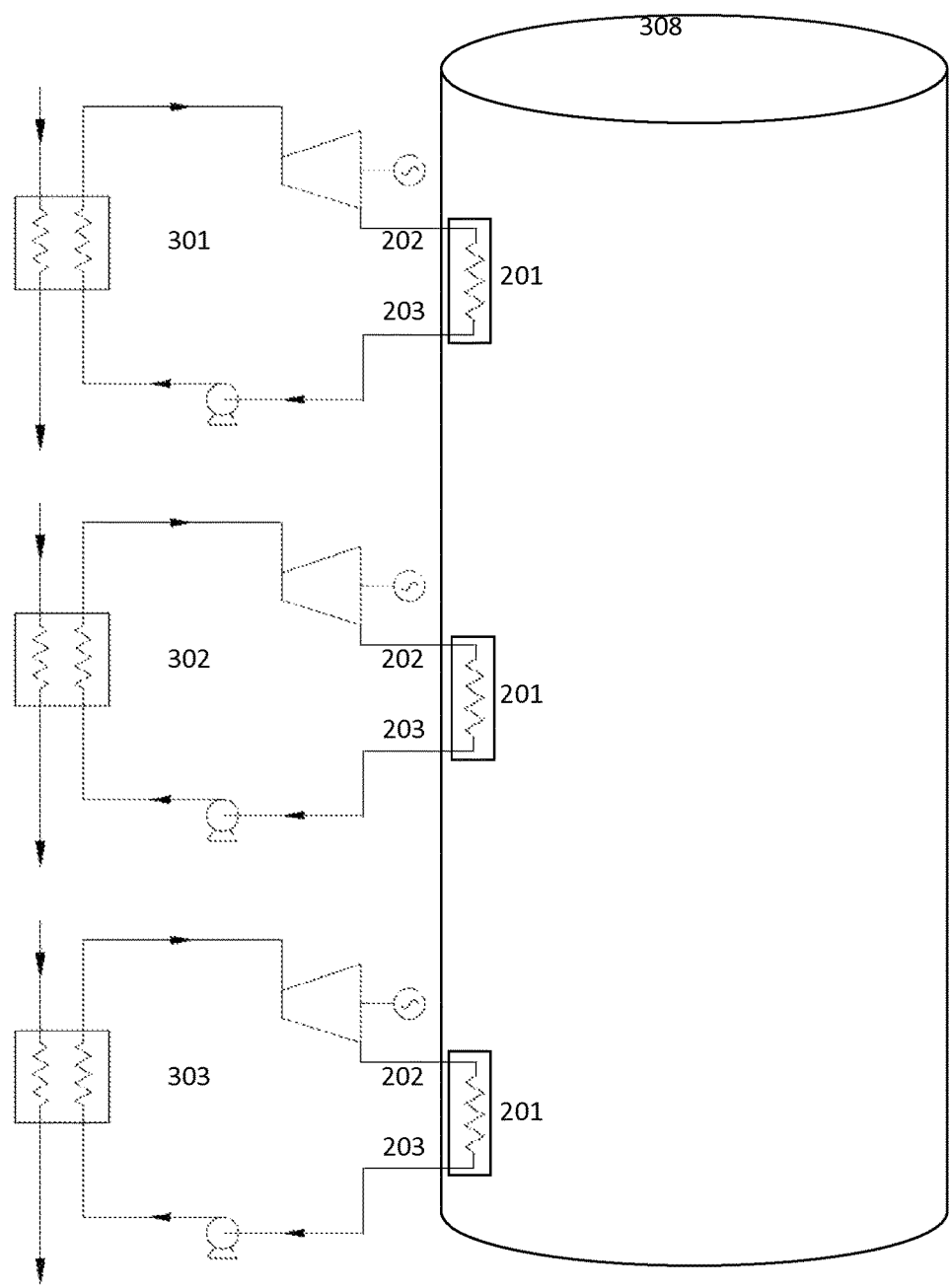
FIG. 3 is a block diagram of multiple ORC systems simultaneously delivering heat energy to a single anaerobic digestion tank while providing condensing functionality for the ORC systems.

With reference now to FIG. 3, a series of ORC systems 301, 302, 303 are combined to provide heat energy to an anaerobic digestion tank 308. Although three ORC systems are depicted, any number of ORC systems can be included to provide the desired level of heat transfer to the anaerobic digestion tank 308. This embodiment may be particularly advantageous for large anaerobic digestion facilities in order to maintain a uniform temperature throughout a large volume anaerobic digestion tank 308. Since the temperature of the medium circulating within the anaerobic digestion heating system can be higher at its point of entry into the tank and generally lowest at its point of exit as the heat energy is transferred to the contents of the tank, the introduction of several independent ORC systems, e.g., 301, 302, 303 at different locations in the anaerobic tank 308 can provide for a more even distribution of heat and corresponding uniform temperature than would be possible from a single source.

The same or similar result may be achieved by a single ORC system (not shown) using a specially designed manifold system (not shown) having multiple heat coupling subsystems 201. For larger digestion tanks, however, the finite heat energy available from a single ORC system may be insufficient to maintain the temperature of the tank contents uniformly at its desired, and in some instances, optimal value. Any configuration of heat coupling subsystems 201 may be employed to provide optimal results.

In order to provide the desired results, the geometry and configuration of an anaerobic digestion tank heat exchanger 201 used to simultaneously heat the contents of the anaerobic digestion tank(s) and provide condensation of the post-expansion working fluid can be designed and implemented in view of the desired performance of both subsystems. In one embodiment, the heated medium (the post-expansion working fluid) flowing within the anaerobic digestion tank heat exchanger 201 may directly circulate within a series of interconnected pipes and/or manifolds (not shown) inside the anaerobic digestion tank(s). These structures can be essentially planar with media flows in a single plane (neglecting the thickness of the components) or may be more three dimensional with heated medium flows in two or more planes. The configuration of the anaerobic digestion tank heat exchanger 201 may be designed with, as shown in FIGS. 2B and 2C, a single input port 202 and output port 203 or may be configured with, as shown in FIG. 3, multiple input ports 202 and output ports 203 to provide a more uniform distribution of heat throughout the anaerobic digestion tank 308. Further, the interconnected pipes and/or manifolds may include a series of valves that permit control and redirection of the heated medium to various regions of the anaerobic digestion tank 308 as may be desired to achieve the preferred distribution of heat. In another embodiment, the heated medium may circulate through sealed channels embedded in the walls of the anaerobic digestion tank(s), thereby heating the contents of the tank at its interior boundaries or side wall(s).

Figure 4:
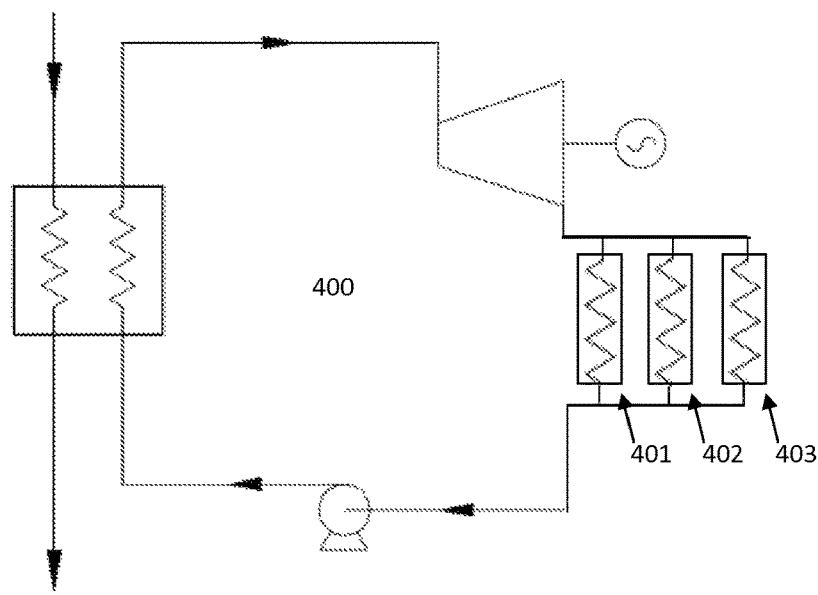
FIG. 4 is a block diagram of a single ORC system simultaneously delivering heat energy to a multiple anaerobic digestion tanks while providing condensing functionality for the ORC system.
Figure 5:
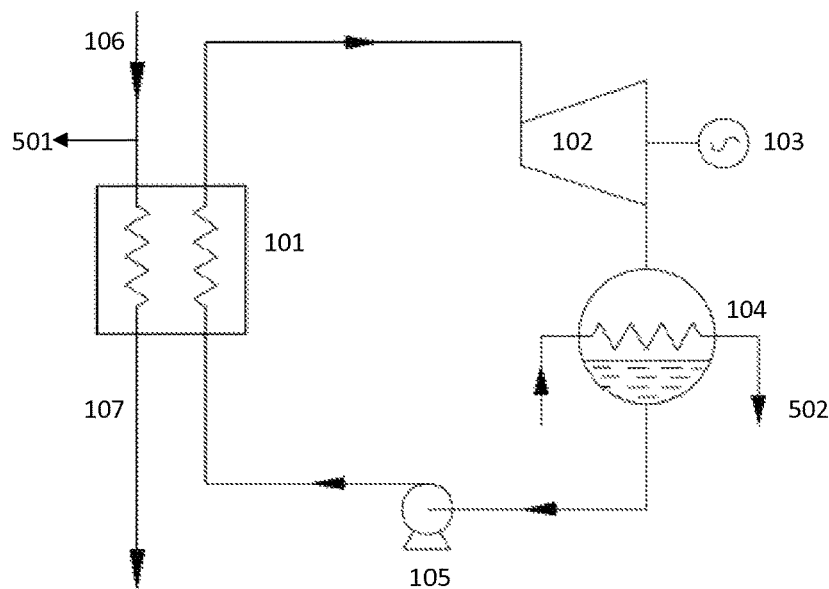
FIG. 5 is a block diagram of a prior art ORC system used to convert waste heat energy into electric power including heat extraction ports that can be used to provide heat for other applications.

With reference now to FIG. 4, a single ORC system 400 may be used to provide heat energy to more than one anaerobic digestion tank (not shown) via multiple heat coupling subsystems 401, 402, and 403. In this embodiment, the available heat energy from post-expansion working fluid from an ORC system 400 is distributed to anaerobic digestion tank heat exchangers (not shown) in each of three discrete anaerobic digestion tanks (not shown) via heat coupling subsystems 401, 402, and 403. Each of these heat coupling subsystems 401, 402, 403 may be comparable to heat coupling subsystem 201 shown in FIG. 2A. The specific distribution of post-expansion working fluid provided to each heat coupling subsystem 401, 402, 403 can be controlled, varying it as needed to allocate the available heat energy among the several tanks. In some instances, this method can be well suited for smaller tanks, systems with reduced requirements for anaerobic digestion heating, or lower temperature mesophilic batch processing, particularly where not all tanks are in simultaneous use. Although three tanks are referenced here, any number of tanks are envisioned that provide the requisite performance.

These combined ORC and anaerobic digestion systems are distinguished from known prior combined heat and power systems in that the prior technology merely siphons some portion of heat energy from ports added to known ORC systems. The known prior art does not teach, for example, the replacement of ORC condenser systems, in whole or in part, with an alternate system including one that simultaneously provides, via one heat coupling subsystem: (i) heating directly to a heat consuming process which provides some beneficial function and (ii) an equivalent cooling and condensation function for the ORC working fluid primary media, which may be heated post-expansion working fluid from the ORC. In this regard, known prior art ORC systems typically require significant electric power to drive fans or an equivalent cooling system. The economic advantage of generating power from waste heat energy is greatly reduced when a large portion of the generated power is consumed by the system's internal requirements (sometimes referred to as the "parasitic load"). The combined ORC and anaerobic digestion system thus provides a double economic advantage; not only is the requisite cooling provided for the primary media, which in the case of an ORC will be heated post-expansion working fluid, without additional electric power consumption, but the electric power normally required to maintain the anaerobic digestion tanks at the optimal temperature is no longer required due to the transfer of heat energy from the companion ORC system. While the known prior art requires electric power to simultaneously cool the ORC media and heat the anaerobic digestion tanks, the combined ORC and anaerobic digestion system reduces or eliminates both requirements for electric power by transferring unwanted heat energy directly via heat coupling subsystem 201 from the ORC system to the anaerobic digestion system. As a result, the net electric power generated by the combined ORC and anaerobic digestion system is significantly greater than in the present art, providing greater economic benefit while conserving resources necessary to produce electric power.

In some embodiments of the present application, anaerobic digestion-based biogas power generation systems can be enhanced by integrating the functions of an ORC waste heat energy generation system with the biogas-burning prime mover and the anaerobic digestion process which generates the biogas for the prime mover. Both the heat input and heat output of the ORC system can be coupled to other components within the overall system. Unlike the known prior art, which does not integrate all three subsystems into a single optimized energy conversion system, some embodiments of the present application provide for increased and possibly maximum efficiency by utilizing more and possibly all available heat energy within the system to a greater, and possibly the greatest, extent practicable.

In certain embodiments, no heat energy is intentionally dissipated or redirected to any non-system application. In certain instances, as some or all of the lowest grade residual waste heat energy remaining after two stages of electric power generation is returned to enhance, and in some instances optimize, the production of fuel for the primary electric power generation process, the system forms a novel and more effective three stage closed-energy-loop.

More specifically, the novel combined prime mover, ORC, and anaerobic digestion system taught herein uniquely allows for each of the three component systems to provide operational benefits of the other two. Specifically, the anaerobic digestion system can, in certain embodiments, be the anaerobic digestion system offered by Harvest Power as described above. In certain embodiments, the prime mover(s), which can be the Jenbacher 312 or 316 internal combustion engines also described above, are fueled by biogas produced by the anaerobic digestion process and cooled, in whole or in part, by one or more ORC system(s) which remove undesired waste heat energy and convert it to useful mechanical and/or electrical power. In this manner, the ORC system(s), which in certain embodiments can be Power+™ ORC system(s) offered by ElectraTherm, Inc. of Reno, Nev., receive their input energy in the form of waste heat from the prime mover(s) and provide post-expansion heat energy to the anaerobic digestion process to enhance the production of biogas fuel for the prime mover(s). Additionally, the heat energy from the ORC that is absorbed by the anaerobic digestion process system provides the necessary cooling condensation of post-expansion ORC working fluid, obviating the need for a separate ORC condenser and the attendant cost of operation. As each of the three component system enhance the operation of the other two, all available heat energy is utilized to the greatest extent possible and the need for additional energy, particularly electrical energy, to provide cooling and/or heating as in the present art is minimized or eliminated.

Figure 7:
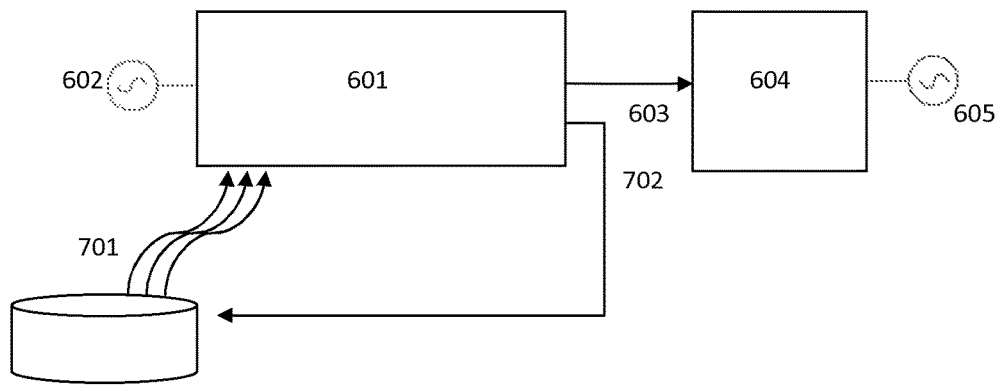
FIG. 7 is a block diagram of the energy flow in a system comprising a prime mover, an ORC system used to convert waste heat energy into electric power, and heat extraction from the prime mover used to improve system efficiency.

In one embodiment depicted in FIG. 7, the prime mover 601 can simultaneously contribute heat energy and/or waste heat energy 603 to the ORC system 604 and heat energy 702 to the anaerobic digestion tank 701, which provides the biogas fuel for the prime mover 601.

Figure 8:
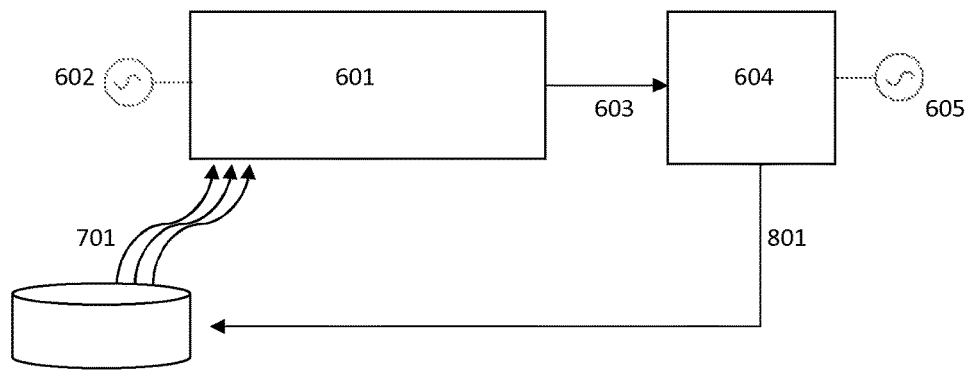
FIG. 8 is a block diagram of the energy flow in a system comprising a prime mover, an ORC system used to convert waste heat energy into electric power, and heat extraction from the ORC system used to improve system efficiency.

In an embodiment depicted in FIG. 8, the ORC system 604 can obtain its heat input from the waste heat energy 603 of prime mover 601 and deliver its own waste heat energy 801 to the anaerobic digestion process. Heat energy flow 801 may be provided from the post-expansion working fluid to anaerobic digestion tank 701.

Figure 9:
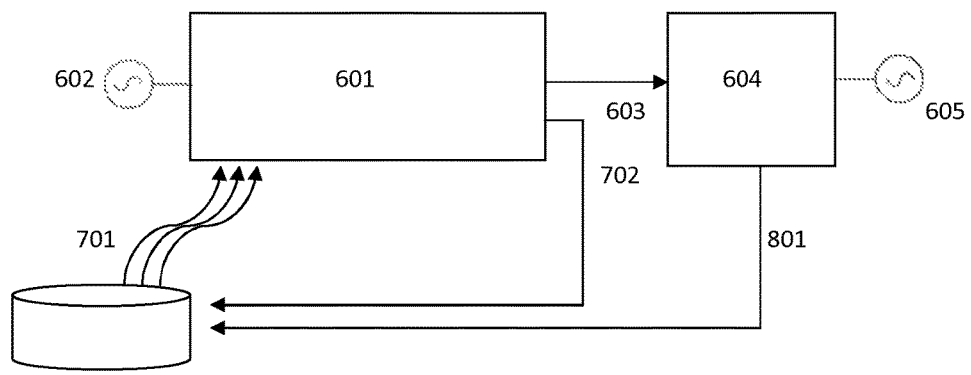
FIG. 9 is a block diagram of the energy flow in a system comprising a prime mover, an ORC system used to convert waste heat energy into electric power, and heat extraction from the prime mover and from ORC system used to improve system efficiency.

In an embodiments depicted in FIG. 9, both the prime mover 601 and the ORC system 604 provide heat energy to anaerobic digestion tank 701 as depicted in FIG. 9 via heat flows 702 and 801, respectively.

Figure 10:
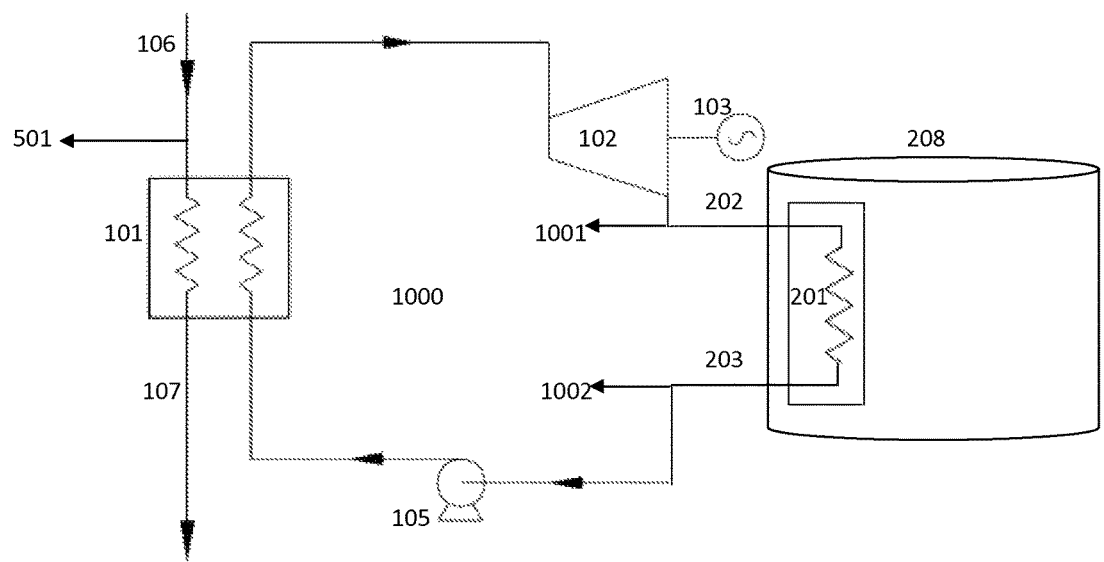
FIG. 10 is a block diagram of a single ORC system used to convert waste heat energy into electric power while simultaneously providing heat energy to a single anaerobic digestion tank that provides condensing functionality for the ORC system, including heat extraction ports that can be used to provide heat for other applications.

In addition to the heat energy being transferred from the primary media (which in some embodiments may be post-expansion ORC working fluid) to the anaerobic digestion process to increase the efficiency of the overall system, heat energy may also be extracted for other purposes. With reference now to FIG. 10, a prime mover (not shown in FIG. 10) can provide heated prime mover media to the heat exchanger 101 of an ORC system 1000 and to a prime mover heat energy output port 501. Post-expansion working fluid heat energy can be provided to the anaerobic digestion tank heat exchanger 201 and to an output port 1001; and post-anaerobic digestion tank heat exchanger heat energy can be provided to output port 1002. Any combination of these ports may be utilized to provide heat energy for one or more purposes not related to the operation of the CHP system.

One or more embodiments of this invention are particularly well-suited for use in wastewater treatment systems where anaerobic digestion systems are common and excess biogas produced by said digestion systems is often burned as flares simply for disposal purposes without providing any beneficial use or other advantage. For the purposes of this disclosure, the phrase "wastewater treatment" shall refer to any or all of the individual processes known in the art whereby chemical, biological, or any other contaminates are removed from an aqueous solution so as to reduce the level of said contaminants, particularly but not necessarily to a level wherein said aqueous solution is suitable for human consumption or unrestricted use. Examples of wastewater treatment facilities include, but are not limited to, sewage treatment plants, irrigation water reclamation processing facilities, and the like. In one wastewater treatment embodiment, the prime mover providing heat to the ORC system may be an internal combustion engine fueled at least in part by the biogas generated as a byproduct of the anaerobic digestion system as disclosed elsewhere herein. Heat energy from the engine jacket cooling water or exhaust gas may be utilized by the ORC. In one embodiment, input heat energy for the ORC system may be provided by one or more boilers fueled by the biogas generated by the anaerobic digestion system or other co-located process as disclosed elsewhere herein. Whenever the term is used anywhere within the scope or applies to any understanding of this disclosure, a co-located device, system or process is one at or sufficiently proximate to the system disclosed herein such that any input or output of said device, system or process may be communicated to any input or output of any device, system or processes directly or indirectly associated with the disclosed system. Means of such communication between devices, systems, or processes may be via any useful means, including but not limited to wires, cable, conductors, electromagnetic waves, pipes, tubing, conduit, raceways, rigid or flexible mechanical devices such as rods, shafts, or linkages of any kind, heat energy radiation, heat energy conduction, or by any other known or subsequently developed means. In one embodiment, input heat energy for the ORC system may be provided by any combination of internal combustion engines or boilers. In one embodiment, input heat for the ORC system may be provided by one or more fuel cells or microturbines. In one embodiment, the dry sludge biosolid byproducts of the anaerobic digestion process or any other co-located process may also be incinerated in one or more boiler(s) and the heat energy of said incineration supplied to the input of the ORC system.

In one non-limiting exemplary embodiment pertinent to wastewater treatment, heat energy may be delivered to system input port 106 of FIG. 2D at an approximate temperature of 240° F. from one or more sources of heat comprising at least one of any of boiler(s) or internal combustion engine(s) consuming some or all of the biogas generated by the local anaerobic digestion system or by any other co-located system or process. The ORC system operates as described elsewhere herein, generating mechanical power via the expansion of heated working fluid in expander 102 and either conveying that mechanical power to generator 103 to provide electrical power output or using the mechanical power directly for some other beneficial purpose.

ORC condensing transfer system 220 is provided to remove residual unwanted heat energy from the post-expansion ORC working fluid and thereby return said working fluid to a sufficiently liquid state. At inlet 233 of intermediate heat transfer unit 104A, condenser heat transfer medium is provided at an approximate temperature of 55°-75° F. at a flow rate of approximately 200 gallons per minute. After receiving heat energy transferred by the post-expansion working fluid, condenser heat transfer medium, now heated to an approximate temperature of 110°-113° F., exits intermediate heat transfer unit 104A at outlet 234 and is pressurized by condensing subsystem pump 221 and conveyed to one or more valve(s) 222.

In one mode of operation of this embodiment, at least a portion of the heated condenser heat transfer medium is provided from said one or more valve(s) 222 to anaerobic digester heat exchanger 223 via input port 224. Here, heat energy is transferred from the heated condenser heat transfer medium to the anaerobic digestion system to maintain the temperature of the cultures in the range of 100°-103° F. for certain cultures and generally within a broader range of 95°-105° suitable for most mesophilic organisms. It should be appreciated the quantity of heat energy available from the system, the temperature of the heated condenser heat transfer medium applied to intermediate heat transfer unit 104A, the volume of the anaerobic digestion tanks, the ambient temperature, and a myriad of other factors will require some degree of regulation in the amount of heat energy necessary to maintain the cultures at their optimum temperature. Such regulation may be provided by the one or more valve(s) 222 via regulation of the mass flow rate of heated condenser heat transfer medium flowing there through. Preferably, the anaerobic digestion tank(s) and condensing transfer system 220 disclosed in detail below each comprise one or more temperature sensors disposed at advantageous points in the system so that the one or more valve(s) 222 may be continuously configured to maintain the temperature of the cultures as desired. When heat energy is required by the cultures, said one or more valve(s) 222 may be operative to provide the requisite heat energy via an increased flow of heated condenser heat transfer medium to anaerobic digester heat exchanger 223. When additional heat energy is no longer required by the cultures, the one or more valve(s) 222 may be operative to reduce or discontinue the flow of heated condenser heat transfer medium to anaerobic digester heat exchanger 223.

It is important to appreciate that under many circumstances, the heat requirements of anaerobic cultures is wholly independent of the cooling requirements of the ORC system and that the system must be configurable to adequately, and preferably optimally, ensure both requirements are simultaneously achieved at all times. Under certain conditions, the ORC system may require additional cooling while the anaerobic digestion system requires additional heat energy; these simultaneous requirements are complementary since the additional heat extracted from the ORC system would be available to the anaerobic digestion system. However, conditions such as high ambient temperature will generally require additional ORC cooling while also reducing the amount of heat required by the cultures, and these simultaneous requirements are contradictory rather than complementary. Excess heat extracted via the ORC cooling process may not be transferred to the cultures without exceeding their optimal temperature, but it must still be extracted from the ORC system to provide proper working fluid condensation and then dissipated or consumed elsewhere.

Accordingly, in another mode of operation, the one or more valve(s) 222 are operative to reduce or discontinue the flow of heated condenser heat transfer medium to anaerobic digester heat exchanger 223 while simultaneously increasing the flow of heated condenser heat transfer medium to the one or more secondary heat exchanger(s) 228. In this manner, the one or more secondary heat exchanger(s) 228 provide a safety valve of sorts for the ORC system which cannot operate without adequate cooling and condensation of the post-expansion working fluid. Preferably, the ORC system, the anaerobic digestion system, and the associated condensing transfer system 220 which operatively connects the two will be provided with sufficient operational flexibility to provide heat energy to the anaerobic digestion cultures under all reasonable conditions and sufficient capacity to provide working fluid condensation/cooling to the ORC system under all reasonable conditions. To accomplish this purpose, the ORC system will also preferably comprise one or more temperature sensors disposed at advantageous points in the system so that the one or more valve(s) 222 may be continuously configured to provide the necessary ORC cooling as desired.

In this and other embodiments, the one or more secondary heat exchanger(s) 228 may comprise any configuration disclosed above, any known otherwise in the art, or any that may be later developed. However, the presence of large reservoirs of treated effluent at wastewater treatment plants enable the preferred use of liquid-cooled radiators described above. At such facilities, the temperature of the on-site treated effluent is not typically regulated or maintained within any specific range, and given the massive aggregate volume of available treated effluent and the relatively low mass flow rate required to provide ORC cooling, the heat energy of any portion of, or all portions of, the heated condenser heat transfer medium may be easily consumed by said treated effluent with only incidental incremental cost and with minimal change in temperature to the aggregate volume thereof. In lieu of massive air-cooled radiators driven by large fans consuming electric power, one or more compact and relatively inexpensive liquid-cooled radiators may be provided. Such radiators, broadly described as heat exchangers, transfer heat energy from the ORC working fluid to an external sink directly or via intermediate means. Specifically, in one embodiment, a flow of heated condenser heat transfer medium in the primary side of a standard heat exchanger functioning as a radiator may be provided in heat energy transfer communication with treated effluent from the wastewater facility counterflowing in the secondary side, where said effluent may provide up to all of the cooling capacity required by the ORC system, even during periods when such cooling requirements are maximized while heat consumption by the anaerobic digestion system is minimized. Further, said effluent may be obtained and discharged into the same reservoirs without the need for a closed loop circulation system with active cooling known in the present art. Generally, such effluent is available for use by the one or more secondary heat exchanger(s) 228 within the range of 50°-70° F., sufficient to cool the heated condenser heat transfer medium to the specified range of 55°-75° F. for application to inlet 233 of intermediate heat transfer unit 104A. Generally, a treated effluent flow of 250-350 gallons per minute will be required for an ORC system configured to generate a net electric power output of 75-92 kWe, which is optimal for the Power+™ ORC system(s) offered by ElectraTherm, Inc. In other embodiments, any other configuration of heat exchanger may be utilized to remove heat from the heated condenser heat transfer medium. For example, a series of manifolds or ducting may be disposed within reservoirs of treated effluent or other media of an appropriate temperature and the heated condenser heat transfer medium cooled by passage through said manifolds or ducting in thermal transfer communication with the treated effluent or other media without the need to establish an active flow of cooling media through a particular apparatus.

In one embodiment, the heat consumed from the post-expansion working fluid by condensing transfer system 220 may also be used to enhance biological nutrient removal processes when the system is deployed at a wastewater treatment plant. As one example not limiting upon the scope of this invention, certain aspects of biological nutrient removal involve an aerobic process comprising nitrification of effluent ammonia into nitrites via one or more first classes of organisms and via one or more second classes of organisms to convert said nitrites into nitrates. Following the nitrification process, denitrification is performed by exposing the produced nitrates to reaction with heterotrophic bacteria cultures in an anoxic environment to yield nitrogen gas. These nitrification and subsequent denitrification processes convert the nitrogen present in effluent ammonia into free nitrogen gas and other non-effluent byproducts, principally water and gasses including hydrogen, oxygen, and carbon dioxide. In this manner, biological nutrients are removed from the wastewater effluent as a part of the overall process of water purification and reclamation.

Proper temperature is critical to the nitrification process. A temperature in the range of 85°-95° F. is preferred to maximize the rate of nitrification, with a reduction of about 18° F. below this level causing a decrease in said nitrification rate of approximately 30%. This lower efficiency would require an increase in the mixed liquor suspended solids (MLSS) of the effluent/organism mixture of approximately 300% to maintain a constant level of nitrification. Such increase is typically required on a seasonal basis for wastewater treatment plants in locations where temperatures vary throughout the year, and operators are presently faced with the unenviable task of determining and adjusting MLSS for proper operation of their facilities. If the temperature of the aerobic nitrification process could be maintained within the desired range of 85°-95° F. throughout the year without incurring any additional operational cost, such as the consumption of electric power to provide heat for this purpose, a substantial advantage over the present art would be realized. Consistent operation could be achieved without the need to adjust MLSS content in bioreactors to compensate for seasonal ambient temperature variations as required by present art systems.

In one embodiment of the present invention, one or more secondary heat exchanger(s) 228 may be configured to provide heat from the heated condenser heat transfer medium to the nitrification process so as to maintain the temperature of said process at its optimal rate. In this embodiment, the one or more valve(s) 222 are configured to adjust the flow of heated condenser heat transfer medium to the nitrification process in any desired portion, said portion determined by the availability of said heated condenser heat transfer medium considered along with the demands of any anaerobic digestion process, demands from any other heat consuming application of the condensing transfer system 220, and the relative priority of all of said applications considered on the whole. Hydrogen gas is produced as a byproduct of the biological nutrient removal process, and in some embodiments, this gas may be captured and burned, either in a boiler or an internal combustion engine, to produce input heat energy for the ORC process in a manner identical to that of the anaerobic digestion process described elsewhere herein. Present art systems typically dispose of hydrogen byproducts via an on-site flare. The capture and re-integration of as many incidental sources of energy as possible, where such sources are presently discarded by systems known in the art, represents a significant advantage over said known systems and provides increased energy efficiency and performance.

In one embodiment of the present invention, anaerobic digester heat exchanger 223 may be replaced with a heat exchanger configured to provide heat energy to the aerobic nitrification component of biological nutrient removal process in lieu of the anaerobic digestion process (not shown). As the biological nutrient removal process produces hydrogen gas as described above, said hydrogen gas is suitable for combustion in either an ICE or a boiler in a manner identical to that employed with biogas generated via the anaerobic digestion process. Accordingly, this application of residual heat energy removed from the ORC working fluid via the condensation process contributes to the generation of fuel for consumption by the source of input heat energy for the ORC via the biological nutrient removal process just as it does with the anaerobic digestion process described elsewhere herein.

Figure 6:
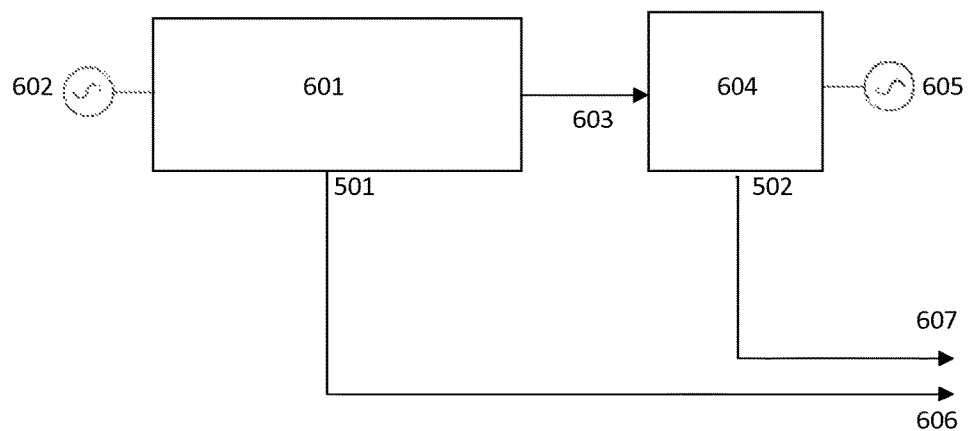
FIG. 6 is a block diagram of the energy flow in a prior art system comprising a prime mover, an ORC system used to convert waste heat energy into electric power, and heat extraction ports for other non-system applications.

In one embodiment, heat energy for biological nutrient removal may be extracted directly from the source of heat energy also supplying input heat to the ORC system as depicted in FIG. 6, FIG. 7, and FIG. 9. Said heat energy may be in addition to, or in lieu of, heat energy provided by condensing transfer system 220, with the preferred point(s) of extraction of said heat energy determined at least in part by the amount of heat energy available from either or both sources, heat energy requirements of this or other processes associated with the system, or based upon any other criteria or according to any other preferences.

Although the disclosure of this example is directed toward the removal of nitrogen from ammonia, a person of ordinary skill in the art will recognize that the teaching herein is applicable to any other biological nutrient removal process requiring or preferring a consistent operating temperature. One or more secondary heat exchanger(s) 228 may be configured to provide heat energy from the heated condenser heat transfer medium to any other process that contributes, in whole or in part, to the removal of biological nutrients or the processing and purification of wastewater. Similarly, in one embodiment, any co-located process or system requiring consumption (removal) of heat energy may be configured to supply heat energy to the ORC working fluid via one or more additional heat exchangers in heat transfer communication with said working fluid (not shown). Alternatively, in one embodiment, heat energy may be removed from any co-located process or system using components similar or identical to the one or more secondary heat exchanger(s) 228 described above. Further, in additional embodiments, processes including but not limited to desalination and distillation may benefit from heat energy extracted from post-expansion ORC working fluid in connection with one or more water purification processes.

The advantages of this and other related embodiments of the invention are considerable. Primarily, mechanical and electric power is generated from the biogas waste product of the anaerobic digestion or other fuel-generating process. Said power may be consumed locally by the wastewater treatment plant for onsite purposes, including but not limited to pumping and stirring, thereby reducing or eliminating consumption of commercial power as is now practiced. Locally-generated electric power may also be applied to the commercial power grid for distribution to other customers, producing an offset to the cost of power consumed whenever the ORC system is offline. A considerable additional advantage is realized by the reduction or elimination of flares now used to burn biogas generated via the anaerobic digestion process. Such flares produce emissions, unsightly visual effects, and potential hazards that would preferably be eliminated when the biogas is consumed by one or more boilers to provide input heat energy for an ORC system. The liquid cooled radiators utilizing treated effluent for heat consumption from the post-expansion ORC working fluid are both considerably smaller, less expensive to install and maintain, and more environmentally compatible than their air-cooled counterparts. The advantages of using anaerobic digestion, biological nutrient removal systems, or other co-located processes to consume heat energy from the ORC system in lieu of consuming electric power or burning only a portion of the generated biogas in separate boiler(s) to heat the process cultures is described in great detail elsewhere herein. And finally, the flexibility of a system that converts waste material into useful mechanical or electric power and biogas, which biogas is then additionally consumed by the same system to optimally generate additional mechanical or electric power, provides a high degree of operational redundancy not known in the prior art.

In addition to anaerobic digestion systems, any application benefitting from significant heat energy may be similarly integrated with an ORC system as a heat receiving system with condensation capacity in the manner taught herein. The anaerobic digestion tank(s) function as a single subsystem providing combined working fluid condensation and the consumption of heat energy for beneficial use. As with the heating of anaerobic digestion tank(s), any application in which coupled heat energy from the primary media may replace the generation of heat energy via the consumption of electric power will operate with greater efficiency and economic benefit and may serve as a heat receiving system with condensation capacity. Such applications may include but are not limited to the heating of water in swimming pools, preheating water for boiler systems, space heating, industrial or large scale domestic hot water systems, combined heat and power systems, and the like. As a result, these systems will also provide the dual benefit of providing heat energy normally produced by electric power while simultaneously eliminating the need for a separate ORC cooling and condensing system in the present art.

In some embodiments where insufficient cooling and condensation functionality may be available from the anaerobic digestion system for proper operation of the ORC, a supplemental or alternate system may be required if it is desirable to run the ORC. In some embodiments, the ORC may serve as a primary cooling system for the prime mover(s). The description of this invention is intended to be enabling and not it will be evident to those skilled in the art that numerous combinations of the embodiments described above may be implemented together as well as separately, and all such combinations constitute embodiments effectively described herein.

What is claimed is:

1. A wastewater treatment energy recovery system comprising:

A. one or more source(s) of heat energy;
   B. one or more water purification process(es):

i. configured to produce at least one byproduct suitable for use by said one or more source(s) to generate heat energy, and
ii. in byproduct sending communication with said one or more source(s) of heat energy; and
C. at least one organic Rankine cycle (ORC) system comprising:
i. a working fluid,
ii. at least one heat exchanger in heat energy receiving communication with said one or more source(s) of heat energy and in heat energy sending communication with said working fluid,
iii. one or more expander(s) in working fluid receiving communication with said at least one heat exchanger;
iv. at least one power receiving apparatus in mechanical power receiving communication with each of said one or more expander(s),
v. a heat coupling subsystem in working fluid receiving communication with each of said one or more expander(s), in heat energy receiving communication with said working fluid, and in heat energy sending communication with said one or more water purification process(es), and
vi. at least one system pump in working fluid receiving communication with said heat coupling subsystem and in working fluid sending communication with said at least one heat exchanger, and
D. one or more valve(s) operative to apportion heat energy among said one or more water purification process(es).

2. The system of claim 1 wherein said one or more source(s) of heat energy comprise at least one of any of a prime mover, an internal combustion engine, a boiler, a fuel cell, and a microturbine.

3. The system of claim 1 wherein said at least one power receiving apparatus includes at least one of any of an electric generator, a prime mover, a pump, a combustion engine, a fan, a turbine, and a compressor.

4. The system of claim 1 wherein at least one of said one or more water purification process(es) comprises at least one of any of an anaerobic digestion process, an aerobic process, a biological nutrient removal processes, and a combustible gas generation process.

5. The system of claim 1 wherein said at least one byproduct comprises at least one of any of a biogas, methane, hydrogen, and a residual solid effluent.

6. The system of claim 1 wherein said ORC system further comprises at least one working fluid condenser in working fluid receiving communication with at least one of said one or more expander(s), in heat energy receiving communication with said working fluid, and in heat energy sending communication with at least one alternate medium.

7. The system of claim 6 wherein said alternate medium comprises at least one of any of air, treated aqueous effluent, and water.

8. The system of claim 6 further comprising one or more valve(s) operative to apportion heat energy among said one or more water purification process(es) and said at least one working fluid condenser.

9. The system of claim 6 further comprising one or more secondary heat exchanger(s) in heated condenser alternate medium receiving communication, wherein said one or more valve(s) are further operative to apportion heat energy among said one or more secondary heat exchanger(s).

10. The system of claim 9 wherein said one or more secondary heat exchangers comprise at least one of any of air cooled radiator(s) and liquid cooled radiator(s).

11. A method of recovering energy from a wastewater treatment system, the method comprising:
A. providing one or more source(s) of heat energy;
B. providing one or more heat consuming water purification process(es) producing at least one byproduct suitable for use in heat generation by said one or more source(s) of heat energy;
C. providing at least one organic Rankine cycle (ORC) system comprising
i. a working fluid,
ii. one or more valve(s);
iii. at least one heat exchanger in heat energy receiving communication with said one or more source(s) of heat energy and in heat energy sending communication with said working fluid;
iv. one or more expander(s) in working fluid receiving communication with said at least one heat exchanger;
v. at least one power receiving apparatus in mechanical power receiving communication with each of said one or more expander(s);
vi. a heat coupling subsystem in working fluid receiving communication with each of said one or more expander(s), in heat energy receiving communication with said working fluid, and in heat energy sending communication with said one or more water purification process(es) via said one or more valves; and
vii. at least one system pump in working fluid receiving communication with said heat coupling subsystem and in working fluid sending communication with said at least one heat exchanger;
D. communicating some or all of said at least one byproduct to said one or more source(s) of heat energy;
E. generating heat energy by said one or more source(s) of heat energy using said some or all of said at least one byproduct;
F. communicating at least some of said generated heat energy to said working fluid via said at least one heat exchanger, thereby creating heated working fluid;
G. expanding said heated working fluid in said one or more expander(s), thereby generating mechanical power and expanded working fluid;
H. communicating said mechanical power to each of said at least one power receiving apparatus;
I. communicating heat energy from the expanded working fluid to said one or more water purification process(es), thereby generating said at least one byproduct; and
J. operating said one or more valve(s) to apportion said heat energy among said one or more water purification process(es).

12. The method of claim 11 wherein said one or more source(s) of heat energy comprise at least one of any of a prime mover, an internal combustion engine, a boiler, a fuel cell, and a microturbine.

13. The method of claim 11 wherein said at least one power receiving apparatus includes at least one of any of an electric generator, a prime mover, a pump, a combustion engine, a fan, a turbine, and a compressor.

14. The method of claim 11 wherein at least one of said one or more water purification process(es) comprises at least one of any of an anaerobic digestion process, an aerobic process, a biological nutrient removal processes, and a combustible gas generation process.

15. The method of claim 11 wherein said at least one byproduct comprises at least one of any of a biogas, methane, hydrogen, and a residual solid effluent.

16. The method of claim 11 wherein said ORC system further comprises at least one working fluid condenser in working fluid receiving communication with at least one of said one or more expander(s), in heat energy receiving communication with said working fluid, and in heat energy sending communication with at least one alternate medium.

17. The method of claim 16 wherein said alternate medium is at least one of any of air, treated aqueous effluent, and water.

18. The method of claim 16 wherein said method further comprises the step of operating said one or more valves to apportion heat energy among said one or more water purification process(es) and said at least one working fluid condenser.

19. The method of claim 16 further comprising (i) one or more secondary heat exchanger(s) in heated alternate medium receiving communication, and (ii) an additional step of operating said one or more valve(s) to apportion said heat energy among said one or more secondary heat exchanger(s).

20. The method of claim 19 wherein said one or more secondary heat exchangers comprise at least one of any of air cooled radiator(s) and liquid cooled radiator(s).

* * * * *